United States Patent
Combe

[11] Patent Number: 5,326,472
[45] Date of Patent: Jul. 5, 1994

[54] FILTER FOR RAPID EXTRACTION OF THE AROMATIC SUBSTANCES OF A PRODUCT BY A LIQUID UNDER PRESSURE, AND AN APPARATUS EQUIPPED WITH A FILTER OF THIS TYPE

[75] Inventor: Daniel Combe, Fareins, France

[73] Assignee: SEB S. A., Selongey, France

[21] Appl. No.: 885,287

[22] Filed: May 18, 1992

[30] Foreign Application Priority Data

May 22, 1991 [FR] France ................. 9106149

[51] Int. Cl.⁵ ............................. B01D 27/10
[52] U.S. Cl. ................... 210/455; 210/477; 210/497.2; 99/295
[58] Field of Search ............... 210/473, 474, 477, 479, 210/481, 482, 455, 497.2; 99/295, 298

[56] References Cited

U.S. PATENT DOCUMENTS

| | | | |
|---|---|---|---|
| 2,483,000 | 9/1949 | Brant | 210/479 |
| 4,255,265 | 3/1981 | Greutert | 210/477 |
| 4,256,585 | 3/1981 | Greutert | 210/477 |
| 4,650,583 | 3/1987 | Bondarini | 210/479 |
| 4,765,896 | 8/1988 | Hartley et al. | 210/479 |
| 4,867,875 | 9/1989 | Perania | 210/474 |

FOREIGN PATENT DOCUMENTS

| | | |
|---|---|---|
| 1454162 | 11/1968 | Fed. Rep. of Germany . |
| 3035157 | 4/1982 | Fed. Rep. of Germany . |
| 2636828 | 3/1990 | France . |
| 2655529 | 6/1991 | France . |

Primary Examiner—Matthew O. Savage
Attorney, Agent, or Firm—Young & Thompson

[57] ABSTRACT

In an apparatus such as an electric coffee-maker, a filter (5) is placed at the bottom of a vessel (3) containing the product to be treated such as ground coffee. Resilient tongues (18) cut in the filter are disposed at uniform intervals about the center so as to form normally-closed orifices (17). When a predetermined pressure of liquid such as hot water is attained within the vessel, the orifices are freed to a sufficient extent to permit filtration of the liquid which has been in contact with the product.

14 Claims, 1 Drawing Sheet

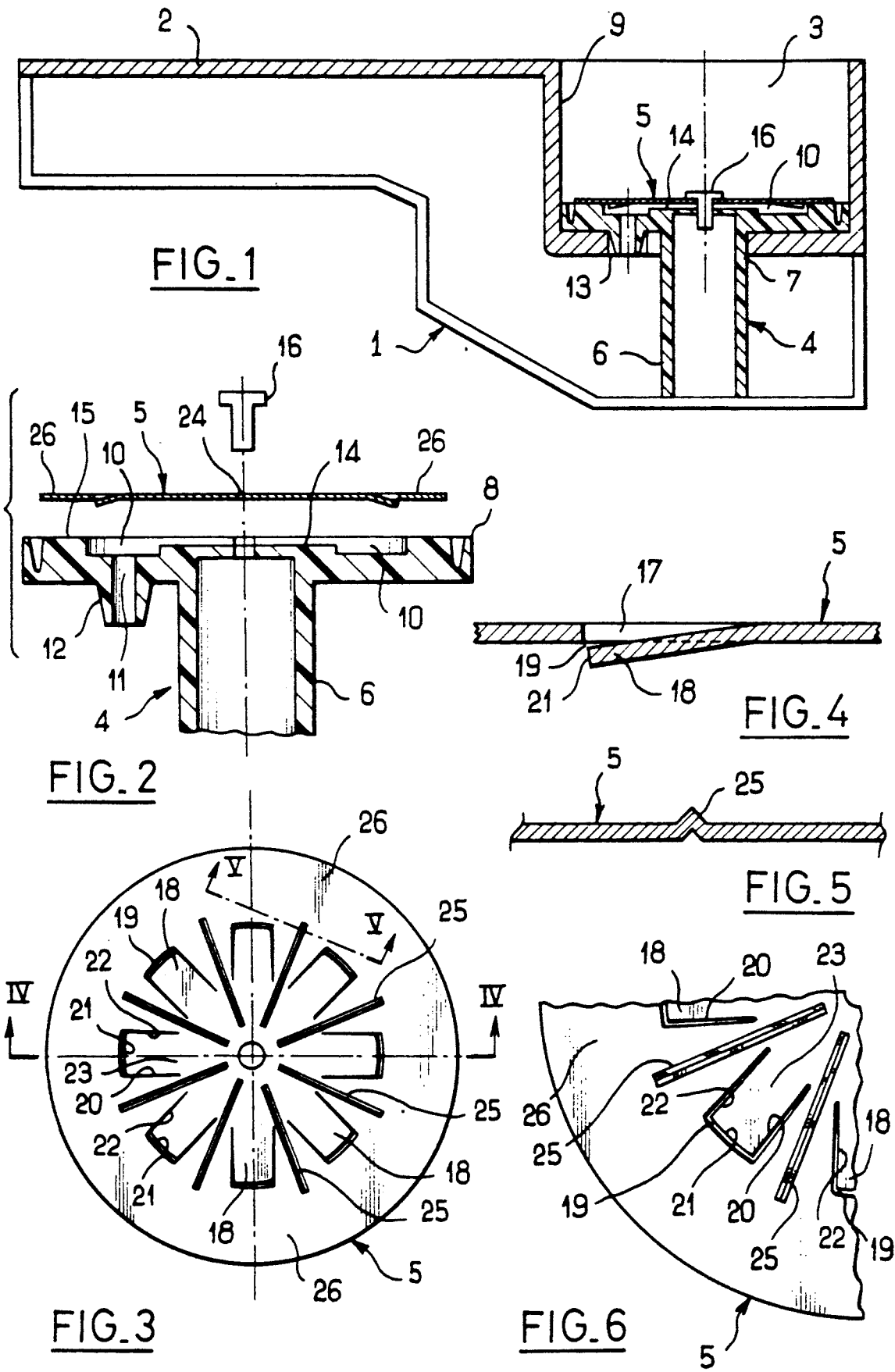

FILTER FOR RAPID EXTRACTION OF THE AROMATIC SUBSTANCES OF A PRODUCT BY A LIQUID UNDER PRESSURE, AND AN APPARATUS EQUIPPED WITH A FILTER OF THIS TYPE

BACKGROUND OF THE INVENTION

1. Field of the Invention

The present invention relates to a filter for rapid extraction of the aromatic substances of a product by a liquid under pressure.

The present invention also relates to an apparatus equipped with a filter of this type.

2. Description of the Prior Art

There was described in French patent Application No. 2 655 529 in the name of the present Applicant an apparatus for the preparation of beverages by rapid extraction of the drinkable aromatic substances of a product which is subjected to a liquid under pressure. In this apparatus, an injector for liquid under pressure opens into a vessel containing the product to be treated, the bottom wall of the treatment vessel being provided with at least one orifice which cooperates with resilient closure means. The orifice is freed by the closure means at least to a partial extent so that, when a predetermined pressure is attained within the treatment vessel, the extract is permitted to flow through a passageway of sufficiently small width to ensure filtration of the liquid which has been in contact with the product to be treated.

When the aforementioned product is ground coffee which is treated with very hot water under pressure in order to obtain "espresso" coffee, there are carried out in a single step the three operations of extraction of aromatic substances, of filtration of the ground coffee in order to allow only the coffee extract to pass through, and of production of froth which is particularly appreciated by users.

However, the particular means described in this prior patent Application are liable to present certain problems of reliability in time.

The object of the present invention is to overcome the disadvantages of the apparatus described in the foregoing and to propose for this apparatus a filter which makes it possible to carry out the three aforementioned operations in a single step, which is easy to construct and the operation of which is particularly reliable over a period of time.

SUMMARY OF THE INVENTION

The filter contemplated by the invention is a filter for the preparation of beverages by rapid extraction by a liquid under pressure of the soluble aromatic substances of a product contained in a treatment vessel having a bottom wall closed by the filter, said filter being provided with at least one orifice adapted to cooperate with resilient closure means which free said orifice so as to provide a narrow passageway when a predetermined pressure of said liquid is attained within the vessel, the width of said passageway being sufficiently small to ensure filtration of the liquid which has been in contact with said product.

In accordance with the invention, the filter is distinguished by the fact that the resilient closure means are constituted by at least one resilient tongue which is attached to the filter and substantially closes-off said orifice.

A resilient tongue is capable of achieving the aforementioned object of the invention.

In an advantageous embodiment of the invention, the filter has a plurality of tongues which are uniformly spaced on said filter and extend radially, each tongue being cut in the thickness of the filter while remaining attached thereto by its base at the end nearest the center of the filter.

The construction of the filter in accordance with the invention is therefore a simple and inexpensive operation.

In a preferred embodiment of the invention, the filter has the shape of a circular disk of stainless steel and the tongues are identical, said tongues being disposed at uniform intervals about the center of the disk and at equal distance from said disk.

By virtue of its nature and its structure, a filter of this type provides very reliable operation at the temperatures and pressures employed.

BRIEF DESCRIPTION OF THE DRAWINGS

FIG. 1 is a longitudinal sectional view of the filter-carrying handle of an "espresso" coffee machine provided with a filter in accordance with the invention.

FIG. 2 is an enlarged exploded view of the filter carrier and of the filter which are shown in FIG. 1.

FIG. 3 is a top view of the filter of FIG. 2.

FIG. 4 is an enlarged fragmentary view in cross-section along line IV—IV in FIG. 3.

FIG. 5 is an enlarged fragmentary view in cross-section along line V—V in FIG. 3.

FIG. 6 is an enlarged view of a portion of FIG. 3.

DETAILED DESCRIPTION OF THE INVENTION

In the embodiment shown in FIG. 1, a handle 1 for a coffee-maker or "espresso" coffee machine comprises a hand-grip 2 and a treatment vessel 3 containing a filter carrier 4 which supports a filter 5 having the intended function of retaining ground coffee.

The handle 1 is of any known type which does not need to be described in detail here and comprises in particular means (not shown) for fixing it in leak-tight manner on the coffee-maker or coffee machine (not shown), such as, for example, radial lugs which are capable of rotational engagement with a helical groove of said coffee-maker or coffee machine.

As illustrated in detail in FIG. 2, the filter carrier 4 is of the movable type in order that it may either be removed from the vessel 3 for cleaning purposes or propelled by a spring-actuated mechanism (of a type known per se but not shown in the drawings) which is housed for example within the hand-grip 2, towards the top portion of the vessel 3 so as to permit easy removal of the spent coffee grounds.

The filter carrier 4 thus has a central guide column 6 which slides freely within a corresponding opening 7 formed in the bottom wall of the vessel 3. Said filter carrier also has a peripheral lip 8 which is intended to form a tight seal with the internal peripheral wall 9 of the vessel 3.

The filter carrier 4 is provided in the top face which receives the filter 5 and the ground coffee with an annular groove 10 which is intended to collect the coffee extract. The groove 10 communicates with a through-hole 11 formed in a nozzle 12 of the filter carrier 4 which extends through an opening 13 of the bottom wall of the vessel 3 in order to permit delivery of the coffee extract to a cup (not shown) which is placed beneath the handle 1.

The filter carrier 4 also has on its top face a central portion 14 which is radially internal with respect to the annular groove 10 and projects with respect to said groove 10 but is set back with respect to the peripheral portion 15 of the filter carrier.

As shown in FIGS. 1 and 2, the filter 5 is supported by its peripheral annulus 26 on the peripheral portion 15 of the filter carrier 4 and is attached thereto at its center by means of a screw 16 which holds it on the filter carrier 4 without producing any deformation of the filter and without tightly applying it on the central portion 14 of the filter carrier.

Generally speaking, the filter 5 is a filter for the preparation of beverages by rapid extraction, by a liquid under pressure, of the soluble aromatic substances of a product contained in the treatment vessel 3, the bottom wall of which is closed by said filter 5.

The filter 5 is provided with a plurality of orifices 17 adapted to cooperate with resilient closure means 18 which free each orifice 17 and thus provide a narrow passageway 19 when a predetermined pressure of said liquid is attained within the vessel 3, the width of said passageway being sufficiently small to ensure filtration of the liquid which has been in contact with said product. In the example of a coffee-maker or "espresso" coffee machine as herein described with reference to the accompanying drawings, ground coffee is placed on the filter 5 within the vessel 3 and very hot water under pressure is then sent onto said ground coffee in order to prepare "espresso" coffee.

As illustrated in detail in FIGS. 3 to 6, the filter 5 is a thin element of flexible material such as stainless steel, which affords resistance to the utilization conditions of temperature, pressure and environment and has a circular shape.

The filter 5 has eight substantially rectangular elongated tongues 18 disposed at uniform intervals about the center 24 of the filter at equal distance from said center.

Each tongue 18 is cut on three sides 20, 21, 22 by shearing in the thickness of the filter 5 and is attached to the filter by its base 23. The tongues 18 extend radially outwards and remain attached to the filter 5 by their base 23 at the end nearest the center 24 of said filter.

Each tongue 18 forms an orifice 17 in the filter 5 and substantially shuts-off said orifice in a resilient manner.

The filter 5 is for example a stainless steel disk having a thickness of 0.3 mm and a radius of approximately 25 mm. At the time of shearing, each tongue 18 is deformed and remains slightly bent, with the result that there remains a narrow slit 19 which can vary between 0 and 0.2 mm.

The sides 21 opposite to the bases of the tongues 18 are located substantially on one and the same circle having a radius of approximately 15 mm. The substantially radial sides 20 and 22 of said tongues are spaced at a distance of approximately 5 mm. Thus the adjacent radial edges 20, 22 of two adjacent tongues 18 are sufficiently close to each other to enable the uncut portions of the filter 5 to undergo a certain deformation under the action of the pressure exerted by the water and the ground coffee during extraction of coffee.

Rigidity of the filter 5 is enhanced by means of radial stiffening ribs 25 obtained by die-stamping of the metal and formed respectively in the portions of the filter 5 which are located between the tongues 18.

The operation of the filter in accordance with the invention and described in the foregoing is as follows.

Under the action of the pressure exerted by the hot water and the ground coffee during the extraction process, the filter 5 undergoes deformation, with the result that its central portion falls until it comes into contact with the central portion 14 of the filter carrier 4 whereas its peripheral annulus 26 remains applied against the peripheral portion 15 of said filter carrier. The tongues 18 in turn undergo flexural deformation. As a result of all these deformations, the slits 19 permit filtration of coffee extract at a higher or lower rate of flow according to the water injection pressure while retaining the particles of ground coffee. The slits 19 then re-close as soon as the pressure falls to zero. This movement of the tongues 18 ensures self-cleaning of the filtration slits 19.

As will be readily apparent, the invention is not limited to the embodiment hereinabove described and any number of changes and modifications may accordingly be made without thereby departing from the scope of the invention.

Thus the filter in accordance with the invention can be employed with any filter carrier, whether fixed or movable, said filter carrier being in turn carried by a handle as described in the foregoing or mounted in any other manner within the body of the machine.

Similarly, the filter in accordance with the invention can be employed with products other than coffee, such as tea, for example.

The rectangular shape of the tongues is not imperative. They may be trapezoidal, triangular or even circular (in the shape of a gibbous crescent).

Provision can be made for any number of tongues which can be arranged either in a circle or in a number of concentric circles.

The tongues can have a direction other than radial on the filter.

What is claimed is:

1. A filter for the preparation of beverages by rapid extraction by a liquid under pressure of soluble aromatic substances of a product contained in a treatment vessel (3) having a bottom wall closed by the filter, said filer (5) comprising at least one orifice (17) adapted to cooperate with resilient closure means (18) which free said orifice (17) so as to provide a narrow passageway (19) when a predetermined pressure of said liquid is attained within the vessel (3), the width of said passageway being sufficiently small to ensure filtration of the liquid which has been in contact with said product, wherein the resilient closure means (18) are constituted by a plurality of tongues (18) uniformly spaced on said filter, each of said tongues being attached to the filter (5) and substantially closing-off said orifice (17).

2. A filter according to claim 1, wherein said filter is constituted by a thin element of flexible material.

3. A filter according to claim 2, wherein said filter has the shape of a circular disk (5) and wherein the tongues (18) are identical and disposed at uniform intervals about the center (24) of the disk (5) at equal distance from said center.

4. A filter according to claim 3, wherein the periphery (26) of said filter rests on the top face of a filter carrier (4), said top face having an annular groove (10) for collecting filtrate, and said resilient tongues (18)

being located above said annular groove when the filter (5) is in a service position on the filter carrier (4).

5. A filter according to claim 4, wherein the filter carrier (4) has on its top face a central portion (14) which is radially internal with respect to the annular groove (10) and projects with respect to said groove (10) but is set back with respect to the peripheral portion (15) of the filter carrier (4) so as to limit the deformation of the central portion of the filter (5).

6. A filter according to claim 3, wherein said filter is made of stainless steel.

7. A filter according to claim 1, wherein the tongues (18) extend in a radial direction.

8. A filter according to claim 7, wherein the tongues (18) remain attached to the filter (5) by their base (23) at the end nearest the center of the filter (5).

9. An apparatus for the preparation of beverages by rapid extraction by a liquid under pressure of the soluble aromatic substances of a product contained in a treatment vessel (3) having a bottom wall closed by a filter, wherein said apparatus is equipped with a filter (5) in accordance with claim 1.

10. An apparatus according to claim 9, wherein said apparatus is an electric coffee-maker or an electric coffee machine.

11. A filter according to claim 1, wherein each of said tongues (18) is cut in the thickness of the filter (5) and remains attached thereto by its base (23).

12. A filter for the preparation of beverages by rapid extraction by a liquid under pressure of soluble aromatic substances of a product contained in a treatment vessel having a bottom wall closed by the filter, said filter comprising a plurality of orifices, each orifice adapted to cooperate with resilient closure means which free said orifices so as to provide a plurality of narrow passageways when a predetermined pressure of said liquid is attained within the vessel, the width of each passageway being sufficiently small to ensure filtration of the liquid which has been in contact with said product, wherein the resilient closure means are constituted by a plurality of uniformly spaced resilient tongues which are attached to the filter and substantially close off said orifice, said filter further comprising a circular thin disc of flexible material, said filter having a periphery resting on the top face of a filter carrier, said top face having an annular groove for collecting filtrate, said resilient tongues being located above said annular groove when the filter is in a service position on the filter carrier, said filter carrier having on its top face a central portion which is radially internal with respect to the annular groove, and projects with respect to said groove, but is set back with respect to the peripheral portion of the filter carrier so as to limit the deformation of the central portion of the filter.

13. An apparatus for the preparation of beverages by rapid extraction by a liquid under pressure of the soluble aromatic substances of a product contained in a treatment vessel (3) having a bottom wall closed by a filter, wherein said apparatus is equipped with a filter (5) in accordance with claim 12.

14. An apparatus according to claim 13, wherein said apparatus is an electric coffeemaker or an electric coffee machine.

* * * * *